June 3, 1924.
C. A. DOREMUS ET AL
1,496,410
PROCESS FOR COLLECTION OF METALLURGICAL FUME
Filed Sept. 25, 1918
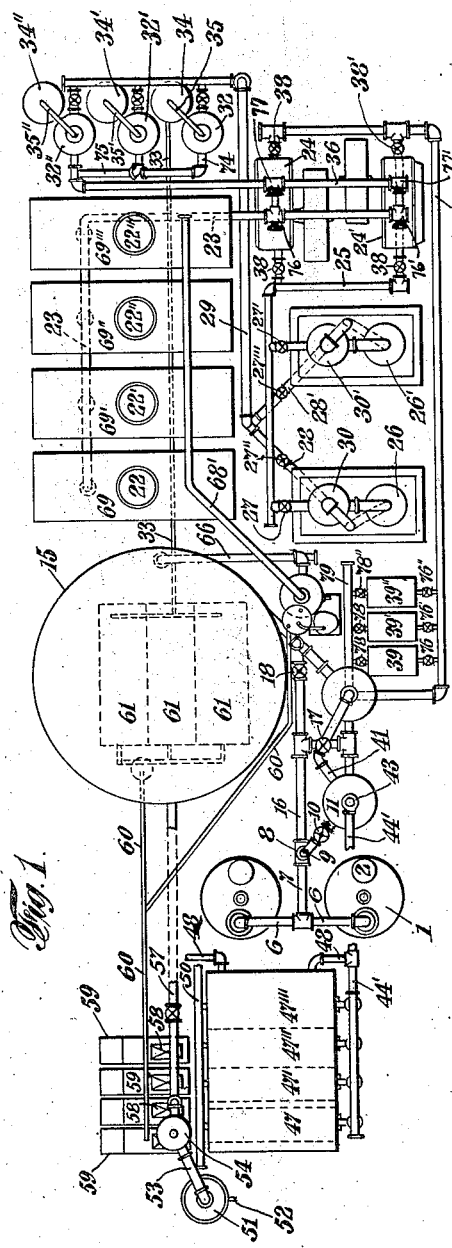
Inventors
Charles A. Doremus
and William M. Grosvenor
By their Attorneys
Kenyon & Kenyon Patented June 3, 1924.

1,496,410

UNITED STATES PATENT OFFICE.

CHARLES A. DOREMUS AND WILLIAM M. GROSVENOR, OF NEW YORK, N. Y.

PROCESS FOR COLLECTION OF METALLURGICAL FUME.

Application filed September 25, 1918. Serial No. 255,606.

*To all whom it may concern:*

Be it known that we, CHARLES A. DOREMUS and WILLIAM M. GROSVENOR, both citizens of the United States, and residents of New York city, in the county of New York and State of New York, have invented certain new and useful Improvements in Processes for Collection of Metallurgical Fume, of which the following is a specification.

The present invention relates to improvements in metallurgy, and more particularly to fume arresting or the treatment of smelter fumes e. g. waste gases from copper smelters and the like, containing fixed gases $O_2$, $N_2$, $SO_2$, $CO_2$, etc., with traces of vaporized or suspended oxides like $SO_3$, $As_2O_3$, $ZnO$, etc., for the purpose of abating the public nuisance caused thereby and incidentally not only recovering therefrom, with greater ease, certain valuable products vaporized or suspended therein, but also producing from the fixed gases thereof valuable commercial products in such commercial quantity as to render the abatement of the nuisance very profitable.

In one aspect the invention consists in bringing together the fumes or acid constituents thereof, such as sulphur or sulphur compounds, either directly, or indirectly after preparatory treatment thereof, with ammonia to form ammonia compounds suitable for fertilizer or other purposes. We are aware that acids either as gas or as liquid have been used for the collection and fixation of the ammonia present in gaseous products from the combustion of coal, but hitherto the reverse process has not been deemed feasible or applied to the great agricultural problem of abating the damage caused particularly by $SO_2$ so largely present in many smelter fumes. We are likewise aware that electrostatic separation has been used to remove the dust and suspended matter from many kinds of industrial fumes and smoke but wholly without effect on the $SO_2$ which the Bureau of Mines (see bulletin 98 Bureau of Mines pp. 39–46) recognizes as the chief source of damage, against which the bureau has no better protection to offer than the manufacture of sulphuric acid in the few locations where it is marketable, or the complicated manufacture of sulphur (see U. S. Bureau of Mines bulletin 133 dated May 1917) both of which are too cheap products to permit of transportation for the long distances generally required to distribute large tonnages of such products from the smelter. The location of the large smelters remote from large manufacturing centers and surrounded by large agricultural areas renders the disposal of such products peculiarly difficult and unless properly disposed of the products themselves are a menace or nuisance of great magnitude. In many cases a smelter produces $SO_2$ corresponding to from 100 to 1000 tons of sulphur per day and such tonnages of sulphur or acid find only remote markets, whereas no case has been found in which such tonnages of fertilizer could not be advantageously disposed of within trucking distance of the smelter. For such tonnages the ammonia produced from the coal is totally inadequate, but according to our invention by a combination of chemical reactions we find it possible to produce from the objectionable gases of the fumes, valuable products that find ample sale and valuable use in the immediate vicinity of the smelter itself and thus convert a source of agricultural loss into a source of large agricultural benefit.

The invention more specifically also consists in eliminating both the transport of the acid products and the transport of the necessary ammonia, by utilizing for the purpose ammonia derived from a definite source, namely derived by synthetic methods at (in the neighborhood of) the smelter itself. Thus the process becomes economically practicable by the combination of the synthetic process for producing ammonia with the reversal of the old process for recovering by acid gases the ammonia from coal furnace gases.

More specifically the invention consists in the treatment of the smelter gases with ammonia or slightly moist fixation gas in two stages in a succession of scrubbers or other precipitators in such a manner that the more impure product, acid in character and containing most of the dust and suspended matter, shall first be removed and therefrom the metallic values readily be recovered, after which the large mass of said gases are removed by union with the ammonia.

More specifically still, the invention consists in the utilization of the above steps to prepare the atmospheric nitrogen by purifying and concentrating it for the utilization of this same nitrogen which has already been through the process, as a source for the synthetic production of ammonia. We are aware that combustion gases have heretofore been used as a source of enriched nitrogen for the production of pure nitrogen for the synthetic manufacture of ammonia, but the previous treatment for purification or enrichment of these combustion gases with ammonia itself, and the production of ammonia from these combustion gases synthetically and the use of this ammonia at the place of production for the definite purpose of reacting with the acid from gases formed at the place of production in order to abate a public nuisance of great magnitude is, so far as we are aware, radically new. It will be noted that the purification of the gases for making ammonia, by means of the ammonia produced therefrom offers peculiar advantages among which is the possibility of using excess ammonia without too expensive loss of ammonia and in some cases without any loss whatever since the ammonia is utilized in the later stages of the process.

The invention may be carried out in a number of different ways utilizing various arrangements of units of apparatus for the well known operations of heating, cooling, mixing, scrubbing and otherwise treating gases, etc. A sulphuric acid for flotation and other purposes and ammonia for making nitric acid and explosives are both usable in small quantities in the region of the smelter, we will describe one form of apparatus for carrying out the invention which has the advantage of enabling portions of these products to be withdrawn at intermediate stages of the process and the process completed with the greater portion of the gas products, and we will then indicate various modifications embodying the invention in its broader aspects.

Preferably the process is conducted in such a way that moist ammonia gas is introduced into the smelter fume to be treated after the latter, if necessary, has been cooled to 500° C. or less by a water spray or cooling chambers or both. This introduction of ammonia has as a result the formation, from the $SO_3$ and $SO_2$ present in the smelter fume, of ammonium salts of the sulphur acids which enclose the fine solid particles of the smelter fume and make them heavier so that they settle, and so that a precipitation of the solid impurities takes place at the same time as the union of the acid components. The ammonium salts of the sulphur acids may be easily converted into ammonium sulphate in a well-known manner. This result of the treatment or repeated treatment of smelter fume with ammonia makes the purified gases, which without this are poorer in oxygen than ordinary atmospheric air, especially suitable for the production of ammonia synthetically for the treatment of further portions of smelter fume. The ammonium sulfate and some other nitrogen compounds formed can be used as fertilizers in the known way.

The invention, of course, does not exclude the combining of the ammonia treatment of smelter fume or the sulphur therefrom with any other or known treatment of smelter fume whereby solid components are settled in dust chambers or separated by filtration and whereby the acid components are washed out and then treated with ammonia. One the other hand it is also not necessary that the ammonia treatment of the smelter fume be carried so far that all the acid components are combined.

In the accompanying drawings we have shown apparatus adapted for carrying out our invention in one form. In these drawings Figure 1 represents a plan view of the apparatus, and Fig. 2 represents a side elevation of the same, many parts of the apparatus, which in themselves are old, separately considered, being represented more or less diagrammatically.

In the two figures, similar numbers indicate corresponding parts. Referring to the drawings, 1 indicates an apparatus wherein the steps of the smelter process are carried out. In this instance, a rotary fines burner of the Herreshoff or O'Brien type is shown as being the most familiar and most easily illustrated. The sulphur compounds are fed in through the hopper 2, and air is admitted by ports in the doors 3, 3. Stirring mechanism or rakes are provided of the well known form, to agitate the mass on its way through the apparatus. 4 is a gear for revolving the rakes or stirring mechanism. The gear 4 is driven in any suitable manner. 5 is an outlet through which the residue is withdrawn from the burner or roaster. Where sulphide ores are treated, this residue consists of the ore which has been either wholly or partially converted. The gases from the apparatus 1 ordinarily at a temperature between 600 and 900° C., escape through the pipe 6 and the main 7. In the burner 1 the air is already deprived of from one-third to one-half of its oxygen, and the escaping gases consist largely of concentrated nitrogen. These gases also contain sulphur dioxide, $SO_2$, and sulphur trioxide, $SO_3$, and in most cases a considerable amount of impurities such as dust and arsenious oxide. The particular impurities existing in the gases will depend upon the nature of the sulphur compound employed in the apparatus 1. The main 7 connects with a stack 9 open to the atmosphere, through which the gases may be permitted to escape temporarily when the burner is being fired up. When the burner 1 has been fired up, the valve 65 is closed or turned and the gases flow from the main 7 through the branch pipe 8 into the outside shell of the heater 11, their flow to said heater being regulated by means of the valve 10. The construction of this heater is well known. It is illustrated in Fig. 2 in which the heater is partly broken away. It consists of an outer shell with inner tubes. The inner tubes are filled with metallic copper for the purposes hereinafter explained. The gases from the pipe 8 pass into the outer shell and heat the tubes containing the metallic copper, and then pass out through the pipe 12 into the upper end of the shell of a similar heater 13. Herein they serve to re-heat the gases passing in the reverse direction through the inner tubes of the heater 13 on their way to be treated by the metallic copper in heater 11. From the heater 13 the gases pass upward through the pipe 14 and through the tangential settling and cooling chamber 15. The construction of such settling and cooling chamber is well knwn. Any suitable form of such chamber may be employed. In chamber 15 the gases are cleansed from the dust, such as finely divided ore, and other impurities, such as arsenious oxide, are condensed and separated from the gases. The gases are thereby cleaned and cooled. 16 is a by-pass pipe connected at one end with the main 7, and at the other end with the pipe 14. It is also connected, as shown, with the pipe 12 leading to the heater 13. The pipe 16 is provided with the valves 17 and 18 to regulate the flow of gases therethrough. It will sometimes be found that the heat of the gases passing from the burner 1 is excessive, in which case a portion of the gases may be by-passed through the pipe 16 immediately to the second heater 13. The flow of gases in this way is regulated by the valve 17. In some cases it may be necessary to discard a further portion of the heat from the first operation, in which case the valve 18 would be opened and a portion of the gases would be allowed to pass directly through the pipe 16 to the pipe 14 leading to the cooling and settling chamber 15. In this way the quantity of hot gases flowing through the heaters 11 and 13 can be regulated.

From the chamber 15 the gases pass through the pipe 66 into the base of the scrubbing or washing tower 67. Any well known form of scrubbing or washing tower may be employed for this purpose. In this tower the gases are brought into intimate contact with sulphuric acid or other suitable liquid. The sulphuric acid dissolves the $SO_3$ which is contained in the gases, and also removes moisture from the gases by absorbing the same. We prefer to use sulphuric acid having a strength of approximately 61° Baumé. 21 is a tank supplied with sulphuric acid and connected with the upper part of the tower so that the sulphuric acid can flow from the tank into the upper end of the tower and down through the tower so as to come into contact with the gases. The sulphuric acid flows from the bottom of the tower through the pipe 68 into the tank 69, whence it is forced up in any suitable manner as by a centrifugal pump 70 through the pipe 20 into the tank 21. It can then be used again for washing purposes in the tower 67. The sulphuric acid in the tank 21 is kept at substantially 61° Baumé by the addition from time to time of sulphuric acid.

The gases which pass from the tower 67 consist mainly of nitrogen, some air, and $SO_2$.

These gases pass through the pipe 68' to the gas filters 69, 69', 69'', 69'''. Any well known form of gas filter may be employed for this purpose. We prefer to use one of the well known forms wherein the gases are strained through asbestos fibre, fine sand, or coke, or through blast furnace slag. The flow of gases into one or the other of these gas filters is regulated by the inlet valves 70, 70', 70'', 70'''. Manholes 22, 22', 22'', and 22''', or other suitable means, are provided for cleaning out these gas filters and renewing their contents. The four or more gas filters are all of the same construction, and are used in multiple simply to secure a thorough and complete separation of the dust from the gases and permit renewals without interruption. These gas filters also remove suspended impurities, such as any traces of $SO_3$, which may not have been removed in the scrubbing tower. From these gas filters the gases pass through the reassembling main 23 to the intake of the blower 24, or 24', as the case may be, which blowers are suitably driven by electric motors or other means. The flow of the gases to one or the other of the blowers is determined by the valves 76 and 76'. From these pressure blowers the gases are forced through the pipe 25 into either of the converters 26 or 26', as controlled by the valves 38 or 38' and 27 or 27'. These converters are constructed in any well known manner to maintain and restrain the temperature of the reaction between oxygen and $SO_2$. The gases are subjected therein to the action of platinum black, or other catalytic material, whereby a further portion of the oxygen of the air is made to combine with $SO_2$ so as to produce $SO_3$. In these converters a sufficient quantity of platinum black must be used and so arranged as to bring the gases into intimate contact with the same so as to cause the platinum to present an extended surface for action. As a result of this treatment the gases which emerge from the converters will contain less than one-third of their original free oxygen, and a very large proportion of nitrogen.
The gases pass out from the converters through the pipes 28 and 28', valves 27'' and 27''', into the pipe 29. The converters are provided with preheaters 30 and 30' at both the inlet and outlet ends, as well as other means 31 and 31', whereby the gas may be independently heated, particularly when the converters are first set in operation.

The gases pass from the pipe 29 into the bottom of the absorbing tower 32, and then upwardly through the absorbing tower. The construction of such an absorbing tower is well known. In this absorbing tower the gases are subjected to the action of sulphuric acid of the highest strength obtainable by concentration, or of other suitable liquor, whereby the sulphur trioxide is absorbed from the gases with great completeness. The sulphuric acid runs out from the bottom of the tower through the pipe 72 into the tank 34, from which it is pumped, by means of a centrifugal pump or other suitable device 73, through the pipe 35, and delivered into the upper end of the tower 32 to be used over again in the manner already explained. In order to thoroughly remove the $SO_3$ we employ two additional absorbing towers 32' and 32'', although one absorbing tower may be all that is necessary in some cases. When additional absorbing towers are used the gases pass from the top of absorbing tower 32 to the bottom of absorbing tower 32' through the pipe 74, and from the top of tower 32' to the bottom of tower 32'' by he pipe 75. The gases are subjected in the second and third absorbing towers to the same treatment as in the first. The second and third towers are provided respectively with tanks 34' and 34'' to receive the sulphuric acid, and with similar centrifugal pumps, and with pipes 35' and 35'' to convey the sulphuric acid back to the top of the towers. In the third tower 32'' a weaker sulphuric acid may be used, if desired, made by the dilution of the concentrated acid employed in towers 32 and 32'. The gases are drawn from the absorbing towers through the pipe 36 to the intake of the pressure blower 24 or 24' as the case may be, and are forced through the pipe 37 to the purifiers 39, 39' and 39''. The flow of these gases into one or the other of the blowers is controlled by the valves 77, 77'. The blowers 24 and 24' are arranged interchangeably, both blowers being connected with inlet pipe 23 and the inlet pipe 36, and with the outlet pipe 25 and the outlet pipe 37, their operation in other ways being regulated by valves 76, 76', 77, 77', 38 and 38'. Thus one of the blowers may be used to suck the gases from the dust catcher 69 through the pipe 23, and to force them through the pipe 25 to the converters, while the other blower is being used to suck the gases from the absorbing towers through the pipe 36, and force them through the pipe 37 to the purifiers.

39, 39' and 39'' are chemical purifiers which are designed to remove any impurity from the gases which would interfere with the fixation of the nitrogen. The construction of such a purifier is well known. If the gases flowing to the purifiers contain some $SO_2$, the purifiers could be provided with an alkali such as caustic soda or caustic lime, and when the gases are passed through such purifiers the $SO_2$ would be removed. Pipe 37 is connected with the three purifiers by means of short connecting pipes provided with valves 78, 78' and 78''. 79 is a pipe leading from the exit side of the purifiers with which it is connected, by branch pipes provided with valves 80, 80' and 80''. Where the nature of the subsequent process for the fixation of the nitrogen (now contained in these gases to the extent of about 90%) will permit of so doing, the gases may be caused to flow directly to the inner tubes 40 of the heater 13, instead of being passed through the purifiers. This can be done by closing the valves 78, 78' and 78'', and opening the valve 81. The gases pass from the pipe 37 into the inner portion 40 of the heater 13, wherein their temperature is raised to the neighborhood of 400° C. by the heated gases flowing from burner 1. The gases then pass from the upper part of the heater 13 through the pipe 41, into the lower part of the inner portion 42 of the heater 11, where they are subjected to the action of metallic copper at a temperature sufficient to insure oxidation. This metallic copper may be charged into and removed from the return portion of this or any form of heater, but is conveniently added through the valved hopper 43, and the copper oxide conveniently removed through the valve 44. By thus subjecting the gases to the metallic copper, they may be substantially freed from oxygen, and the gases will then pass out through the pipe 44' and will consist practically of pure nitrogen. 47, 47', 47'' and 47''' are retorts of any well known form, represented as supported in brick work and arranged to be fired from below. These retorts are charged with carbide of calcium prepared in the electric furnace and preferably made of impure quality. The retorts are constructed in any well known manner to hold the carbide of calcium so disposed that the gas flowing into the retort will be brought into intimate contact with the carbide of calcium with which it is to combine chemically. The nitrogen gas flows from the pipe 44′ through the branch pipes 45 into the retorts, and, under the action of heat, the nitrogen is absorbed by the carbide of calcium to form cyanamide. When this absorption is completed the valves 46 are closed, and steam which has been superheated in the pipe 48 is admitted to the retorts through the valves 49, and reacts with the cyanamide in the well known way to form gaseous ammonia, or the cyanamide may be removed and separately treated in digesters.

The ammonia and the excess of steam flow out into the pipe 50 and pass into the lower part of the scrubbing tower 51. This scrubbing tower is a well known device, and is designed to condense the excess of steam without condensing the ammonia gas. Any well known means may be used for condensing steam in this tower. For example, the tower may be filled with baffle plates, or anything to cause water to condense. The condensed water flows out through the pipe 52. The ammonia gas mixed with some water vapor escapes from the top of the tower through the pipe 53 to the reflux cooler 54. This cooler is made in any well known way, and is supplied with cold water, used for cooling purposes, by the pipe 55. Any vapor or water that is condensed in the cooler 54 flows back into the tower 51 through the pipe 56. The ammonia gas flows through the pipe 57 to a series of absorption bells 58, which are slightly immersed in absorption liquor in a series of tanks 59. These absorption bells are constructed in any well known way.

The sulphuric acid which is formed from the gas in the absorbing towers 32, 32′, and 32″, or a part of it, is allowed to flow or is pumped by any suitable device through the pipe 33 to the reserve tanks 61. Sulphuric acid is fed through the pipe 60 from the tank 21, or from the reserve tanks 61 by pump 60′ to the absorption tanks 59, and is used as the absorption liquor in those tanks. Enough sulphuric acid is fed in this way to the liquor in the tanks 59 from time to time, to maintain that liquor either neutral or acid. The ammonia gas flowing into the liquor in the tanks 69, will combine with the sulphuric acid and form crystalline ammonium sulphate, which may be removed from the tanks 59 in any suitable manner.

From time to time the dust or the condensed products that gather in the exterior shell of the heater 11, or of the heater 13, may be removed by any suitable means.

Many changes and modifications may be made in the process and apparatus described, some of which have been indicated above. For example, the conversion of sulphurous acid may only be partial. Should the nature of the fixation process be such that certain definite percentages of oxygen are required, the treatment with copper may be omitted. Also, should the fixation process employed require the presence of moisture in certain quantities, it may be added to the dry gases, or any desired proportion of atmospheric air may be mixed with the gases at any suitable point. Again in the use of certain sulphur compounds, or in the production of certain nitrogen compounds, it may be found unnecessary to employ some or all of the steps above described for removing dust or other impurities from the gases. Likewise, the acid constituents may be combined with nitrogen taken from other bodies of air in the neighborhood of the smelter by any suitable process of nitrogen fixation. If crude compounds are desired, the gas purifiers and washers may also be omitted.

It is also obvious that the settling of dust may be accomplished or promoted in the chamber 15 by admitting thereto moist ammonia gas from the pipe 57 as illustrated in dotted lines in the drawings to form sufficient compounds containing nitrogen and sulphur to cause precipitation of the metalliferous particles and dust. Should the manufacture of sulphuric acid not be desirable, we may directly unite the gaseous ammonia from the fixation process with part or all of the acids of sulphur in the impure smelter fume to form compounds containing nitrogen and sulphur (readily oxidizable to form ammonium sulphate) with the simultaneous removal of impurities and especially of suspended matter. It is also clear that we may, without departing from the spirit of the invention, omit the converters 26 and the heaters 30 and may use ammonia gas from the pipe 50 with water in the towers 32, thereby also forming thionamic acid $SO_2NH_3$ which may be either $SO_2NH_2H$ or $SO.OH.NH_2$. This is formed when dry $SO_2$ and $NH_3$ combine in equal volumes. When $SO_2$ is in excess and moisture is present $(NH_4)_2SO_4$ and the ammonium salts of other sulphur acids result. If excess or ammonia is present, the ammonium salt of thionamic acid is formed. When the ammonia gas is introduced directly into each of the towers 32 as above explained, the precipitated ammonia compound in the first tower (believed to be principally $(NH_4)_2SO_4$) carries down with it most of the fine metallic dust particles of gold, silver, arsenic, selenium, bismuth etc., which are likely to be present in various forms, for example as sulphides, tellurides, oxides, nitrides, etc., in the smelter fume along with other dust particles, and the separation of such metallic dust particles in this way leaves them in a condition such that the metal therein in easily recovered. When the fume passes into the other towers relatively pure ammonia compounds with the acid constituents of the fume are precipitated; we believe in the second and third towers thionamic acid together with varying proportions of the ammonium salt of thionamic acid are produced. Likewise if ammonia gas from the pipe 50 be also used in the cooling and settling chamber 15 some crude ammonia compounds are here precipitated and the gases purified so that scrubbers, 67, filters 69, 69', 69'' and 69''' as well as heaters 30 and 30' and converters 26 and 26' may be omitted and the acid gases united with ammonia from pipe 50 in towers 32 using the tanks 34 for circulating the thionic absorption liquid and if it is desired, this may be oxidized with hot air, by recirculation in similar addition towers. It will be understood that sulphur may be present in the fumes in many forms such as $SO_2$, $SO_3$, S and $H_2S$ and each of these may be reacted upon and absorbed in the process. The reaction on these sulphur bodies produces some thionates of ammonia and sulphur dust in the gases is dissolved by these and partly oxidized after solution to form di-thionates. A simple form of apparatus for carrying out the more important features of this invention would consist of the chamber 15 with its connection as shown in dotted lines to the pipe 57 admitting a small amount of moist ammonia gas and its outlet pipe 66 through a Cottrell separator of well known construction to a similar second cooling and treating chamber like 15 but of larger size and provided with a connection to the pipe 50 (or the pipe 53) admitting to the second chamber a large amount of steam and ammonia gas. The exit of this second chamber could go direct to the atmosphere or through another Cottrell separator. In this case the acid constituents would be combined into nitrogen products made synthetically by any suitable process of fixation from other bodies of air in the neighborhood of the smelter. Or instead of using the chamber 15 the gas direct from the heater 11 used as a cooler may be taken to the absorption tower 32 where it is joined by moist ammonia gas from the pipe 57 and the dust and a part of the ammonia compounds in crude form here scrubbed out with absorption liquor from the tank 34 after which the purified gases proceed to the next tower 32' and are here mixed with wet ammonia gas from the pipe 50 and scrubbed with liquor from the tank 34' to produce substantially pure ammonia compounds after which the gases are finally scrubbed with water from tank 34'' in tower 32'' before being released to the atmosphere or utilized to make fresh ammonia. It will, therefore, be obvious that the invention in its broader aspects may take many other and widely different forms.

What we claim as new and desire to secure by Letters Patent is:—

1. In the process of treating smelter fumes, the steps which consist in combining sulphur from the fumes with ammonia for the purpose of producing valuable products, using the smelter fume gas after purification by said combination, as nitrogen containing material for the synthetic production of ammonia, and combining ammonia so produced with sulphur from the fumes.

2. In the process for the treatment of smelter fumes, the steps which consist in first treating the fume with ammonia to remove therefrom impurities with some ammonia compounds and then treating the remaining fume with more ammonia to produce more and relatively pure ammonia compounds of acid constituents from the fume.

3. In the process for the treatment of smelter fume containing valuable fine metallic dust particles, the step which consists in introducing ammonia gas into the fume to combine with the acid constituent thereof and form an ammonia compound therewith, which settles out from the fume and carries with it the fine metallic dust particles in a condition to be easily recovered.

4. In the process for the treatment of smelter fumes the step which consists in treating the smelter fume with gaseous ammonia thereby concentrating the nitrogen of the fume, deriving ammonia from said nitrogen and treating more of the fume with said ammonia.

5. In the process for the treatment of smelter fumes, the steps which consist in treating the fume with ammonia to remove therefrom dust or impurities with some ammonia compounds, and then combining an ammonia compound with sulphur from the remaining fume to obtain valuable products.

6. In the process for the treatment of smelter fumes, the steps which consist in treating the fume with ammonia to remove therefrom dust or impurities with some ammonia compounds, and then combining an ammonia compound with sulphur from the remaining fume to obtain valuable products, and using the concentrated nitrogen of the fume for the production of more ammonia for treatment of the fume.

7. In the process of treating smelter fumes containing metallurgical dust the step which consists in introducing ammonia into the fume to combine with the acid constituent thereof and form an ammonia compound therewith which settles out from the fume and carries with it metallurgical dust particles in a condition such that they may be recovered.

Signed at New York, in the county of New York and State of New York, this 23rd day of September A. D. 1918.

CHARLES A. DOREMUS.
WILLIAM M. GROSVENOR.

Witnesses:
JAMES N. TIMMERMANN,
R. S. BADER.